UNITED STATES PATENT OFFICE.

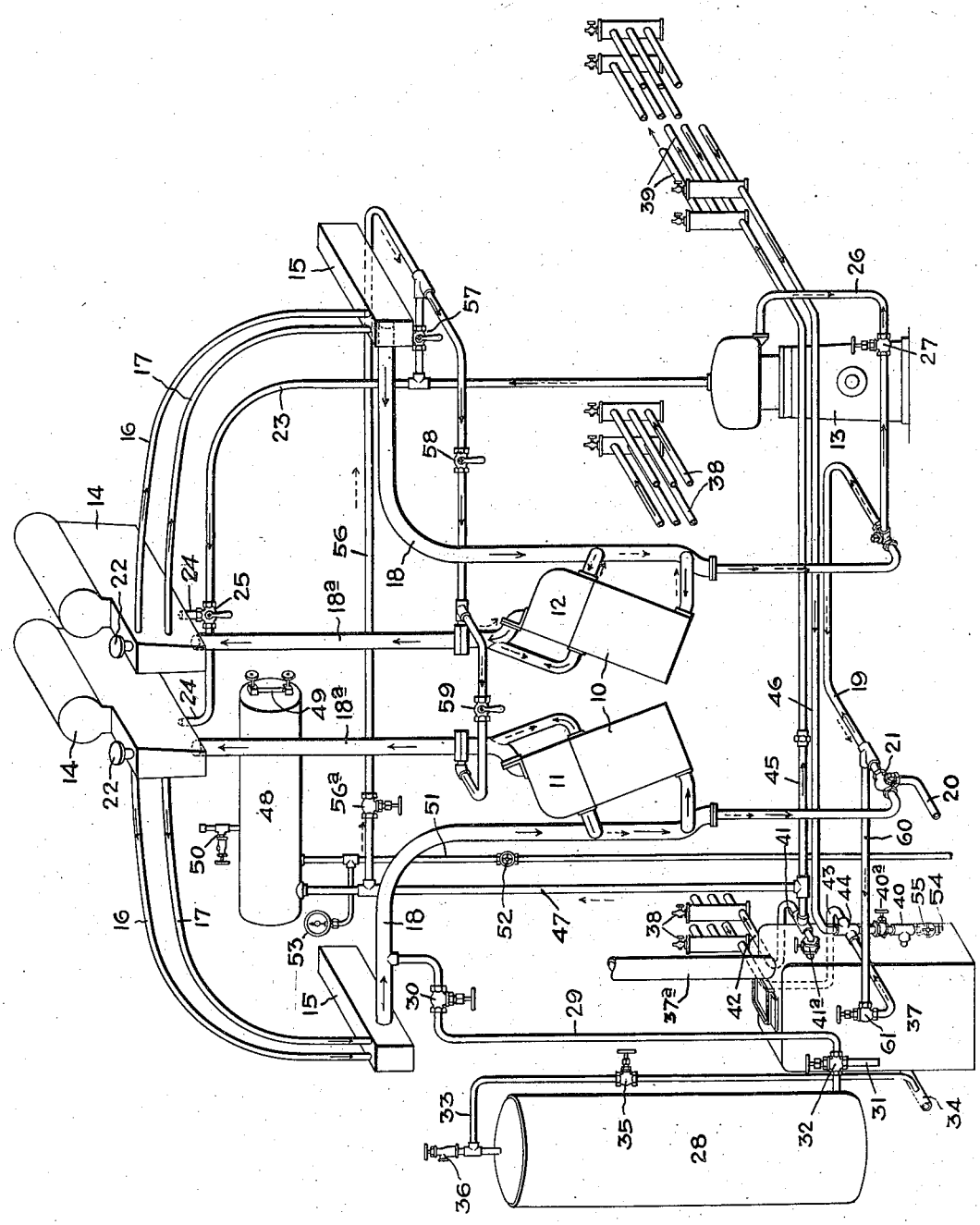

HENRI G. CHATAIN, OF ERIE, PENNSYLVANIA, ASSIGNOR TO GENERAL ELECTRIC COMPANY, A CORPORATION OF NEW YORK.

ENGINE-COOLING AND CAR-HEATING SYSTEM.

1,167,151.  Specification of Letters Patent.  Patented Jan. 4, 1916.

Application filed November 17, 1914. Serial No. 872,621.

*To all whom it may concern:*

Be it known that I, HENRI G. CHATAIN, a citizen of the United States, residing at Erie, county of Erie, State of Pennsylvania, have invented certain new and useful Improvements in Engine-Cooling and Car-Heating Systems, of which the following is a specification.

The present invention relates to motor cars in which an internal combustion engine is employed for propelling purposes, and more especially to such cars where an engine drives an electric generator and the latter supplies current to motors mounted on one or more of the car trucks. The engine and generator are mounted in the front end of the car, the remainder being devoted to passengers, baggage, etc. In such an equipment it is necessary to provide a circulating system for cooling the engine both in cold and hot weather, and some means for preventing in cold weather the freezing of the cooling water in the radiator and connecting pipes when the engine is idle. It is also necessary to provide a heating system for the car.

The object of the present invention is to provide an improved engine cooling and car heating system.

For a consideration of what I believe to be novel and my invention, attention is directed to the accompanying description and claims appended thereto.

Referring to the drawing, the single figure is a diagrammatic view of my improved system, the parts of the car proper being omitted for the sake of greater clearness.

Referring to the drawing, 10 indicates the main internal combustion engine for propelling the vehicle. It is shown as comprising two sets of cylinders 11 and 12, the number of cylinders in each set being usually four.

13 indicates a small internal combustion engine for driving a generator for lighting the car and driving an air pump, the latter supplying air for starting, braking, etc. The radiator for cooling the circulating water for the engine jacket comprises two principal sections, one on the right-hand side and the other on the left-hand side of the car, said radiator being located above the roof and corresponding approximately in shape to the curvature thereof. One of these sections is connected with the set of engine cylinders 11 and the other with the set of engine cylinders 12. Each radiator section comprises an upper header 14 located at about the center of the car roof and a lower header 15 located near the side of the car. Connecting these headers are outer cooling tubes 16 and inner cooling tubes 17. Only two of these tubes on each side are shown, but it will be understood that a multiplicity of such tubes will be used and that they will preferably be provided with heat radiating fins in order to increase the effective radiation thereof. The lower headers 15 are connected to the engine cylinder by the conduits 18. The upper headers are connected to the engine cylinders by the conduits 18ª. Connecting the lower ends of the conduits 18 is an equalizing pipe 19. Connected at the lowest point of this equalizing pipe is a drain pipe and filling pipe 20. This drain pipe may be connected with either side of the radiator by means of the three-way valve 21.

22 indicates filling openings in the upper headers. The cooling jacket of the auxiliary engine 13 is connected to the upper headers by pipe 23 which has a branch 24 leading to each header. A three-way valve 25 is arranged in these pipes so that the jacket of engine 13 may be connected to either header as desired.

26 indicates a pipe connecting the cooling jacket of the engine 13 to the equalizing pipe 19. In this pipe is the valve 27.

28 indicates a tank connected with the radiator by the pipe 29 in which is a valve 30. This tank is of such capacity as to just hold the water from the radiator and to limit the level below which the water can be drained in the pipe 29. The pipe 29 at its lowest point is provided with a drain pipe 31 controlled by the cross valve 32. Connected with the top of the tank is the pipe 33 by means of which compressed air may be led to the tank from the air pipe 34. In the pipe 33 is a suitable valve 35.

36 indicates a safety valve which may be set for any suitable pressure.

The arrangement so far described constitutes the engine cooling system proper.

37 indicates a heater or boiler of any suitable construction for heating the water used in the car heating coils, and 37ª is a stack therefor. Two sets of heating coils or pipes are shown, the set 38 being in the passenger section of the car and set 39 being in the baggage section. These sets are connected in parallel to the heater by connectors 40 and 41. Hot water flows from the boiler or heater through the pipe 42 to the heating pipes 38 and from them through pipe 43, connector 44, and connector 40 to the boiler. Water also flows from the boiler through the connector 41, pipe 45, heating pipes 39, pipe 46, connectors 44 and 40 to the boiler. Connected with the pipe 45 by means of pipe 47 is the expansion tank 48. This tank is provided with a gage glass 49 and a safety valve 50. Connected with the tank is a drain pipe 51 having a valve 52 therein. Connected to this pipe 51 is a suitable pressure gage 53. 54 is a drain pipe and filling pipe having therein a valve 55. At 40$^a$ and 41$^a$ are valves for shutting off the heating coils from the heaters. The arrangement described in this paragraph constitutes the hot water heating system for the car.

At times it is desirable to connect the heater with the engine jackets so as to keep the engine warm when idle, and, in cold weather, to prevent the water in the jackets from freezing, thus avoiding the necessity of draining the water therefrom. It may also be desirable at certain times, as for example in mild weather, to use a portion of the water from the engine jackets for heating the car. I have accordingly provided a novel arrangement for connecting the engine cooling system to the heater, and for also connecting the heating coils to the engine cooling system. To this end I provide a pipe 56 connecting the pipe 47 with the pipes 23 and 18$^a$. These connections are controlled by the valves 56$^a$, 57, 58 and 59 respectively. Connecting the equalizing pipe 19 with the connector 44 is a pipe 60 having a valve 61 therein.

The operation of this system is as follows: Under normal running conditions the valves 56$^a$ and 61 will be closed, thus separating the engine cooling system from the heating system. Either or both may then be operated wholly independently of the other. The valves 57, 58 and 59 will also preferably be closed. Under these conditions the circulation in the heating system and in the engine cooling system is as indicated by the full line arrows, and will be obvious without further explanation.

When in freezing weather the car is to be left standing for some time and the engine is idle, the radiator sections are drained into the tank 28 by opening the valve 30. If now it is desired to connect the engine to the car heating system to keep the engine warm, the valves 56$^a$ and 61 are opened and also valves 57, 58 and 59. Hot water from the heating system then flows through the engine jackets as indicated by the broken line arrows. That is, water flows from the pipe 47 which connects the heater to the equalizing tank 48, through pipe 56, valves 57, 58 and 59, down through the jackets of the engines 10 to the equalizing pipe 19 and down through pipe 23 to the jacket of the auxiliary engine 13, thence by pipe 26 to the equalizing pipe. From the equalizing pipe the water flows through pipe 60, valve 61, and connector 44 to the heater. It will be noted that the connection to each set of cooling jackets is controlled by a separate valve 57, 58 or 59 so that if desired all the jackets need not be connected to the heating system at the same time. Under some circumstances this arrangement is very useful, as it enables a set of jackets to be cut out in case of an emergency requiring it. When the car is to be put into use again after standing idle, the engine jackets are disconnected from the heater (if connected thereto) and the water from the tank 28 is forced back into the radiator sections by opening valve 35 and admitting compressed air from pipe 34 to the top of the tank.

It may sometimes be desirable, as for example, in mild weather, to connect the car heating coils to the engine jackets to heat the car. For this purpose the valves 40$^a$ and 41$^a$ will preferably be closed so as to disconnect the heating coils from the heater and the valves 56$^a$, 57, 58 and 59 opened. This permits water to flow from pipes 18$^a$ and 23 through pipe 56 and down pipe 47 to the heating coils. The water then returns from the heating coils to the engine jackets by way of valve 61, pipe 60, and equalizing connection 19. It will be clear that instead of connecting all three sets of engine jackets to the heating coils I may connect only one, or I may connect two, as the connections are each controlled by a separate valve as already pointed out.

The heating system may be filled by connecting a suitable source of water supply under pressure to the pipe 54. Likewise the system may be drained through this pipe.

The cooling system may be filled through pipe 20, the three-way valve being turned to fill first one side of the system and then the other. If the source of water supply available is not of sufficient pressure to fill this system from below, it may be filled through the filling opening 22. This pipe may also be used to drain the system.

It will be understood that the different valves, as 56$^a$, 57, 58, 59, 61, etc., are all regulable and under the different conditions of operation may be opened to any desired extent so as to obtain the desired distribution of the water.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is:—

1. In combination, an engine having a cooling jacket, a radiator located above the engine for dissipating the heat of the fluid circulating through the jacket, a heater, a heating system connected thereto, a tank, and valved conduit means for draining the radiator into the tank and connecting the cooling jacket to the heating system.

2. In combination, an engine having a cooling jacket, a radiator located above the engine, pipes connecting the engine jacket thereto, a heater, a hot water heating system connected thereto comprising circulating coils, an expansion tank located above the same, and a pipe connecting the expansion tank to the circulating coils; and a valved pipe connecting the last named pipe to the first named pipes at points between the top of the engine and the radiator.

3. In combination, an engine having a cooling jacket, a radiator located above the engine, pipes connecting the engine jacket thereto, a heater, a hot water heating system connected thereto, comprising circulating coils, an expansion tank located above the same, and a pipe connecting the expansion tank to the circulating coils; a valved pipe connecting the last named pipe to the first named pipes at points between the top of the engine and the radiator, a second tank, and a valved conduit connecting the second tank to the radiator for draining the same.

4. In combination, an engine having a cooling jacket, a radiator located above the engine for dissipating the heat of the fluid circulating through the jacket, a heater, a heating system connected thereto, a tank, valved conduit means for draining the radiator into the tank and connecting the cooling jacket to the heating system, and a pipe for conveying air under pressure to said tank to force the cooling medium back into the radiator.

5. In a combined car heating and engine cooling system, the combination of an engine having two sets of cylinders with cooling jackets, a radiator comprising two sections located above the engine, conduits connecting the cooling jackets of one set of cylinders to each radiator section, a heater, a heating system connected thereto, a tank, a pipe for draining the radiator into the tank, pipes connecting the heating system to the conduits at points between the top of the engine and the radiator, and valves in said pipes controlling the connection to each set of cylinders.

6. In combination, an engine having a cooling jacket, a radiator located above the engine, pipes connecting the engine jacket thereto, a heater, a hot water heating system connected thereto comprising circulating coils, an expansion tank located above the same, and a pipe connecting the expansion tank to the circulating coils; a valved pipe connecting the last named pipe to the first named pipes at points between the top of the engine and the radiator, and means for disconnecting the heater from the heating system.

7. In a combined car heating and engine cooling system, the combination of an engine having two sets of cylinders with cooling jackets, a radiator comprising two sections located above the engine, conduits connecting the cooling jackets of one set of cylinders to each radiator section, a heater, a heating system connected thereto, a tank, a pipe for draining the radiator into the tank, pipes connecting the heating system to the conduits at a point between the top of the engine and the radiator, valves in said pipes controlling the connection to each set of cylinders, and valves whereby the heater may be disconnected from the heating system.

In witness whereof, I have hereunto set my hand this 13th day of November, 1914.

HENRI G. CHATAIN.

Witnesses:
  O. T. FOUCHE,
  MARY ETHEL PORTER.